(No Model.) 2 Sheets—Sheet 1.
H. F. PEARSON & G. W. JARMIN.
CHECK ROW CORN PLANTER.
No. 318,650. Patented May 26, 1885.
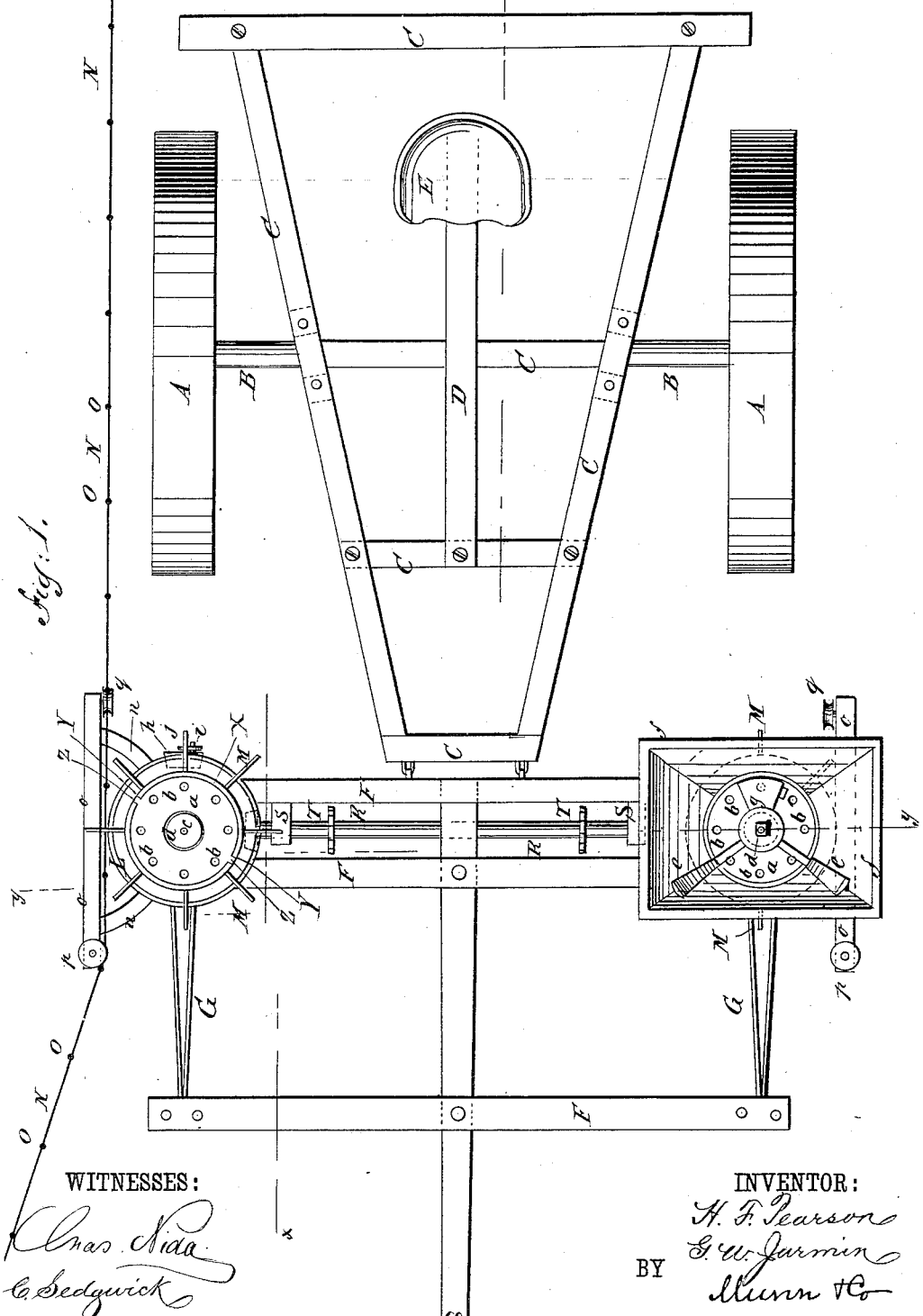
WITNESSES:
Chas Nida
C. Sedgwick
INVENTOR:
H. F. Pearson
G. W. Jarmin
BY Munn & Co
ATTORNEYS.

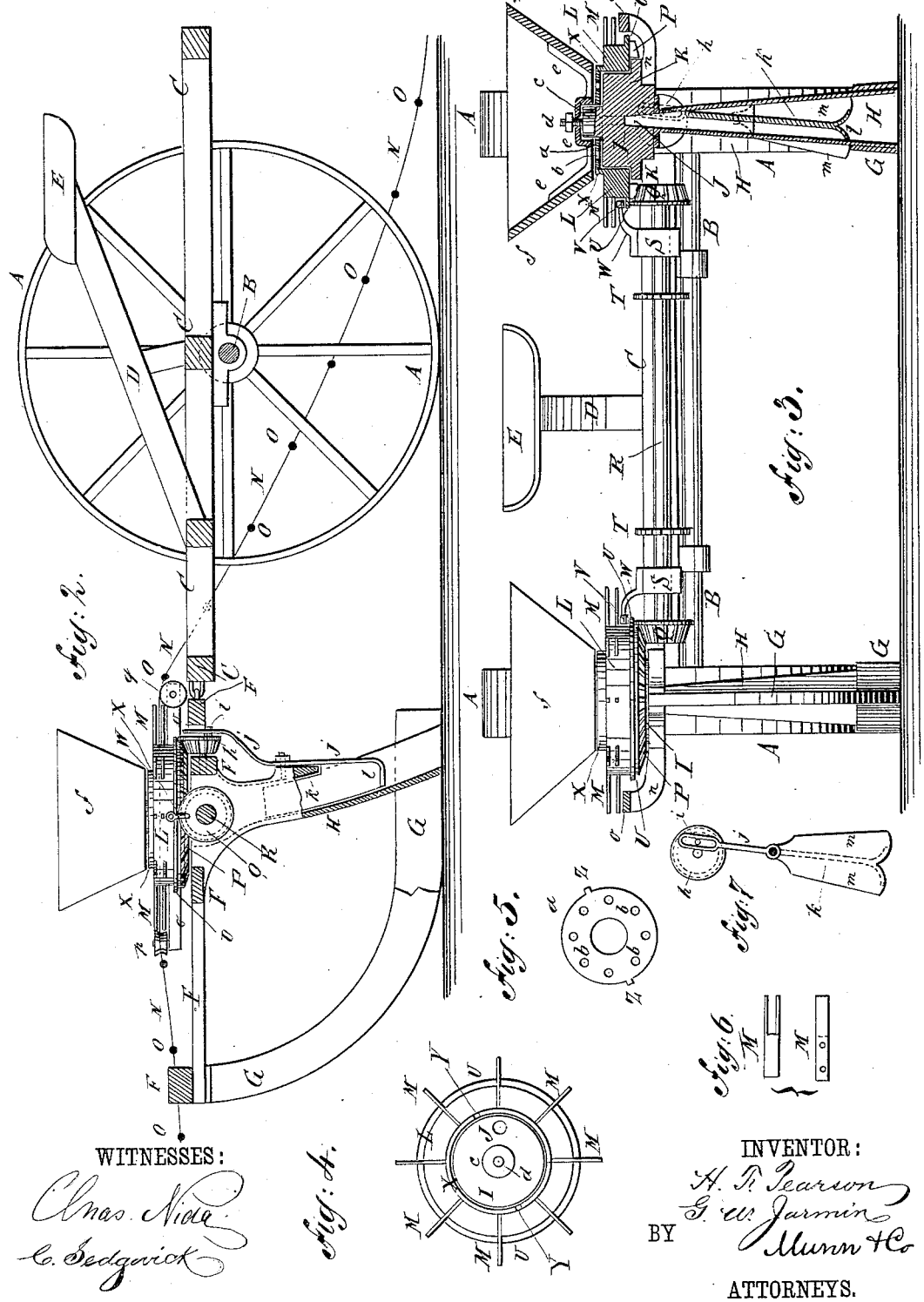

UNITED STATES PATENT OFFICE.

HENRY F. PEARSON AND GEORGE W. JARMIN, OF GENOA, NEBRASKA.

CHECK-ROW CORN-PLANTER.

SPECIFICATION forming part of Letters Patent No. 318,650, dated May 26, 1885.

Application filed January 17, 1885. (No model.)

*To all whom it may concern:*

Be it known that we, HENRY F. PEARSON and GEORGE W. JARMIN, both of Genoa, in the county of Nance and State of Nebraska, have invented certain new and useful Improvements in Check-Row Corn-Planters, of which the following is a full, clear, and exact description.

Reference is to be had to the accompanying drawings, forming part of this specification, in which similar letters of reference indicate corresponding parts in all the figures.

Figure 1, Sheet 1, is a plan view of one of our improved corn-planters, one seed-box being removed. Fig. 2, Sheet 2, is a sectional side elevation of the same, taken through the broken line $x\ x$, Fig. 1. Fig. 3, Sheet 2, is a sectional front elevation, partly in section, through the line $y\ y$, Fig. 1. Fig. 4, Sheet 2, is a plan view of the armed ring and the head-block, the seed-dropping plate being removed. Fig. 5, Sheet 2, is a plan view of the seed-dropping plate. Fig. 6, Sheet 2, is a side elevation and a plan view of one of the slotted arms. Fig. 7, Sheet 2, is a rear elevation of the conducting-spout valve-plate and its lever and drive-wheel.

The object of this invention is to provide check-row corn-planters constructed in such a manner that the seed will be dropped with certainty and at uniform distances apart.

The invention consists in the construction and arrangement of parts, as will be hereinafter fully described and claimed.

A represents the wheels, B the axle, and C the frame, of the carriage, which is provided with a seat-standard, D, and a driver's seat, E, and is hinged at its forward end to the rear cross-bar of the planter-frame F.

To the frame F are attached the runners G, by which channels are opened in the soil to receive the seed. The rear ends of the runners G are slotted, and to them are secured the lower ends of the spouts H, by which the seed is conducted to the ground. The upper ends of the conducting-spouts H are attached to head-blocks I, which are attached to the planter-frame F, and have perforations J formed through them, through which the seed passes to the conducting-spouts H.

Upon the lower parts of the outer edges of the head-block I are formed flanges K, to serve as seats to the rings or annular plates L, to the upper parts of the outer edges of which are attached outwardly-projecting radial arms M, the outer parts of which are slotted to receive the check-wire N, so that the said rings L will be turned by the contact of the knobs or balls O of the check-wire N with the said arms M.

Upon the lower sides of the rings L are formed gear-teeth P, which mesh into the teeth of the small gear-wheels Q, attached to the ends of the shaft R. The shaft R revolves in bearings S, attached to the frame F, so that the seed-dropping plates of the two seed-boxes will be operated at the same time. The shaft R is provided with ratchet-wheels T, with which are designed to engage pawls pivoted to levers fulcrumed to the frame F, so that the seed-dropping mechanism can be operated by hand when starting in at the ends of the rows to cause the hills to be planted in accurate check-row.

The pawls and levers are not shown in the drawings, as there is nothing new in their construction or operation.

Upon the lower parts of the outer edges of the rings L are formed horizontal flanges U, which project over the gear-wheels Q, and upon which rest small rollers V, pivoted to arms W, attached to the bearings S, or other suitable supports, so that the said rings L will be held down to their seats.

Upon the upper parts of the inner edges of the rings L are formed vertical flanges X, in the upper edges of which are formed recesses Y, to receive lugs Z, formed upon the edges of the plates $a$, so that the said plates will be carried around by and with the said rings in their movements. In the plates $a$ are formed perforations $b$, each of which is made of such a size as to receive enough seed for a hill. As many perforations are formed in each plate $a$ as there are slotted arms M attached to each ring L, and the said perforations are so arranged that at each movement of the said ring a perforation $b$ will come over the perforation J in the head-block I, and drop the seed through the said perforation J into the conducting-spout H.

Upon the centers of the upper sides of the head-blocks I are formed cylindrical projections c, which pass through central apertures in the seed-dropping plates a, so as to center the said plates in place.

To the tops of the projections c are attached bolts d, which pass through the cup-shaped centers of the spiders e, and have nuts screwed upon their upper ends to secure the said spiders in place. The arms of the spiders e are bent upward and are attached to the seed-boxes f, so that the said seed-boxes will be supported by the head-blocks I. To the spiders e or the seed-boxes f are attached cut-offs g, which cover the parts of the seed-dropping plates a above the discharge-perforation J in the head-block I, so that no more seed can pass out than is contained in the perforation of the said plate that is over the said perforation J.

To a cross-bar of the frame F, or some other suitable support, are pivoted beveled gear-wheels h, the teeth of which mesh into the gear-teeth P of the rings L, and to which are attached crank-pins i. The crank-pins i work in slots in the upper ends of levers j, which are pivoted to supports attached to the conducting-spouts H. The levers j pass in through openings in the rear sides of the conducting-spouts H, and to their lower ends are attached valve-plates k, placed within the said conducting-spouts H.

To the lower ends of the valve-plates k are attached or upon them are formed laterally-curved flanges l, to successively receive the seed as it falls into the conducting-spouts H, and detain it till the next movement of the rings L operates the valve-plate k and drops the seed to the ground. To the rear edges of the valve-plates k are attached laterally-projecting flanges or wings m, to cover the openings in the rear sides of the conducting-spouts H, and prevent the seed from escaping through the said openings.

To the head-blocks I or the frame F are attached outwardly-projecting arms n, to the outer ends of which are attached bars o.

To the upper sides of the forward ends of the bars o are pivoted pulleys p, around which the check-wire N passes to the machine. To the inner sides of the rear ends of the bars o are pivoted pulleys q, over which the check-wire end passes from the machine.

With this construction, as each ball O of the check-wire N comes in contact with a slotted arm M of the ring L it turns the said ring, and with it the seed-dropping plate a, so far as to bring the perforation b of the said plate over the perforation J of the head-block I, and drop the seed to the valve-plate k. As each ball O of the check-wire N passes from a slotted arm M, it leaves the ring L in such a position that the next ball of the said wire will engage with the next slotted arm of the said ring, and again drop the seed to the valve-plate k. Each time the ring L is turned by a ball O of the check-wire N, the valve-plate k is operated to drop the seed resting upon it to the ground, and to bring it into position to receive seed upon its other side, and detain the said seed until the said valve-plate is again operated by the next movement of the ring L, so that the seed will be dropped with certainty and at uniform distances apart.

Having thus described our invention, what we claim as new, and desire to secure by Letters Patent, is—

1. In a check-row corn-planter, the combination, with the conducting-spout H and the seed-box f, of the head-block I, having perforation J, flange K, and projection c, the ring L, having slotted arms M and flanges U X, the arm W, engaging the flange U to hold the ring in place, the perforated seed-dropping plate a, held within the flange X, and the cut-off g, substantially as herein shown and described, whereby the said seed-dropping plate will be operated to drop the seed by the balls of the check-wire, as set forth.

2. A check-row corn-planter consisting, essentially, of the frame, the runners, the spout, the apertured head-block I, provided with top projection, c, side flange, K, arms n, and bar o, provided with pulleys p q, the ring L, supported on the flange K of the head-block, and provided with slotted arms M, gear P on its under side, and flange X on its upper side, the seed-dropping plate a, held in the flange X, the spider e, fitted over the projection c, the hopper f, the gear h, having a crank-pin i, and meshing with the gear P, the valve-plate k, and the connecting-lever j, substantially as set forth.

3. In a check-row corn-planter, the combination, with the flanged ring L, of the roller V and arm W, substantially as herein shown and described, whereby the said ring is held down to its seat, as set forth.

HENRY F. PEARSON.
GEORGE W. JARMIN.

Witnesses:
S. B. COWLES,
E. G. COOK.